Sept. 18, 1923.

E. E. ROBERTS 1,468,401

POWER TRANSMISSION MECHANISM

Filed June 5, 1922 2 Sheets-Sheet 1

INVENTOR.
ERVIN E. ROBERTS.
BY A. B. Bowman
ATTORNEY.

Sept. 18, 1923.

E. E. ROBERTS 1,468,401

POWER TRANSMISSION MECHANISM

Filed June 5, 1922          2 Sheets-Sheet 2

INVENTOR.
ERVIN E. ROBERTS.
BY A. B. Bowman
ATTORNEY

Patented Sept. 18, 1923.

1,468,401

UNITED STATES PATENT OFFICE.

ERVIN E. ROBERTS, OF PALMS, CALIFORNIA.

POWER-TRANSMISSION MECHANISM.

Application filed June 5, 1922. Serial No. 566,039.

*To all whom it may concern:*

Be it known that I, ERVIN E. ROBERTS, a citizen of the United States, residing at Palms, in the county of Los Angeles and State of California, have invented a certain new and useful Power-Transmission Mechanism, of which the following is a specification.

My invention relates to speed changing and reverse power transmission mechanism, more particularly applicable to self propelled vehicles, and the object of my invention is primarily to provide improvements over my power transmission mechanism patented in the United States Patent Office December 5, 1916, Patent Number 1,207,216, and the principal objects of said improvements are: First, to provide a power transmission mechanism of this class with simple, novel and efficient means for changing speeds by shifting certain power transmitting members; second, to provide a mechanism of this class in which the variable speed driving member may be thrown out of engagement and at the same time the driving shaft is directly connected with the driven shaft; third, to provide a mechanism of this class with novel pedal and lever means for relieving the pressure between the engaging surfaces of the variable speed member and the power transmitting roller member; fourth, to provide an automatic speed accelerating and retarding power transmission mechanism; fifth, to provide novel semi-automatic means in connection with a power transmission mechanism of this class for shifting into engagement and disengaging the direct drive mechanism and the reverse mechanism; sixth, to provide a novelly constructed power transmission mechanism of this class, and seventh, to provide a mechanism of this class which is very simple and economical of construction, proportionate to its functions, efficient, durable and which will not readily deteriorate or get out of order.

Figure 1:
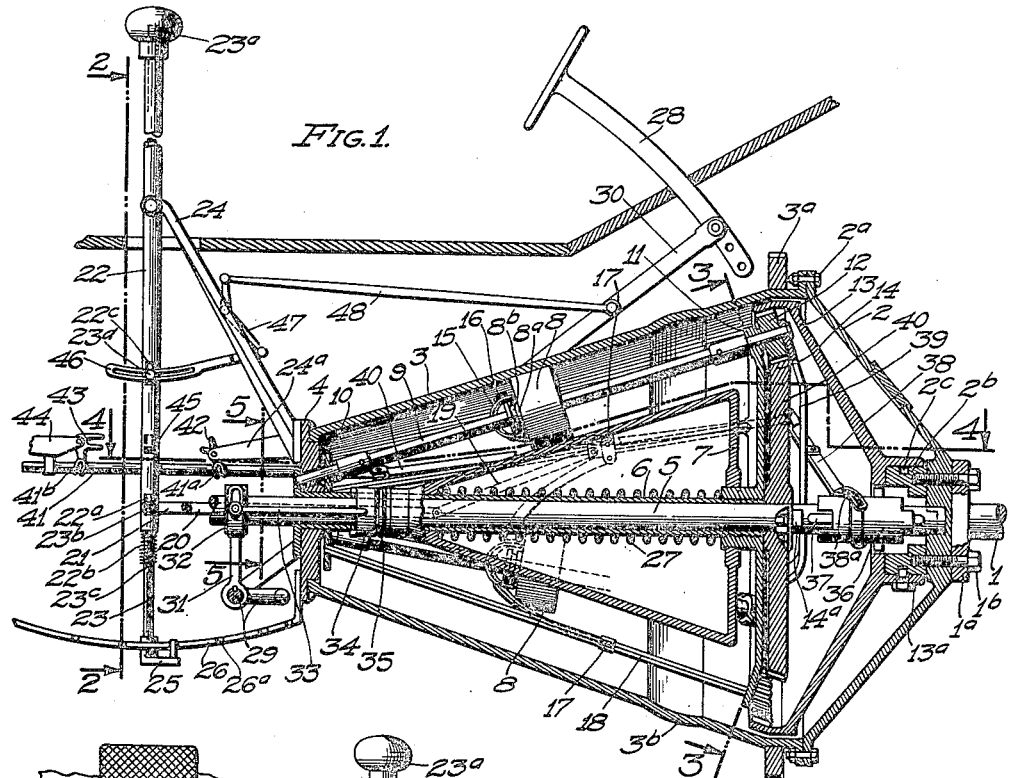
Figure 2:
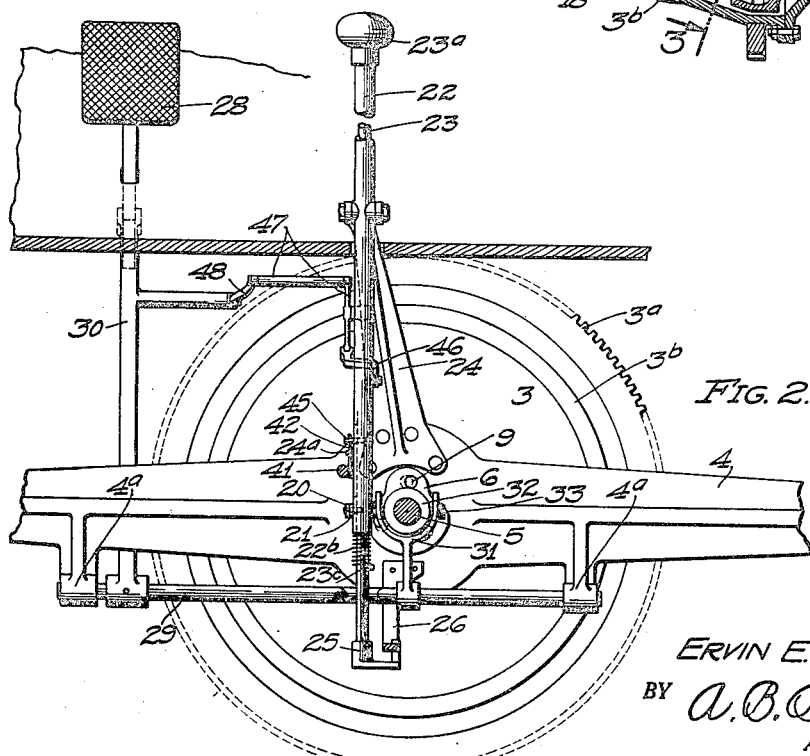
Figures 3, 5:
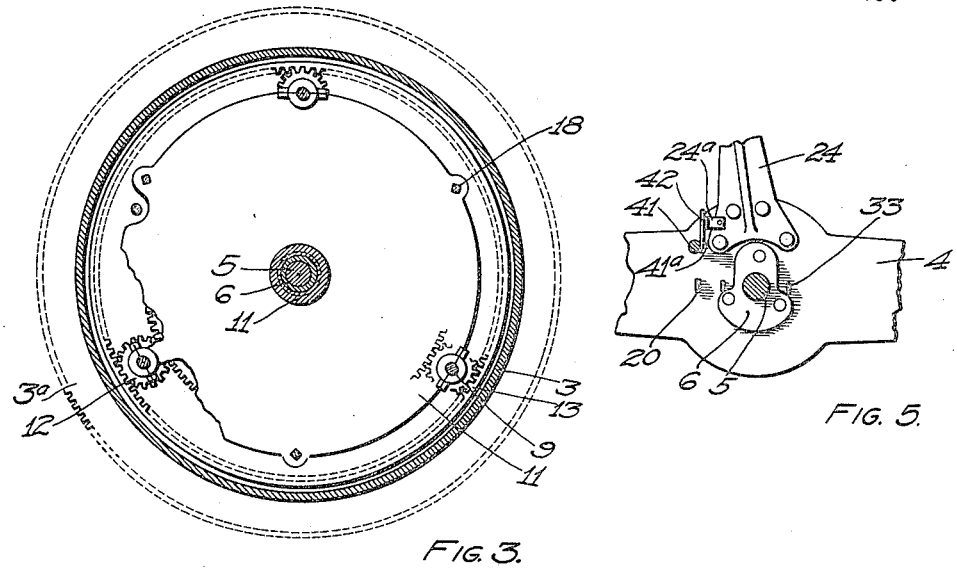
Figure 4:
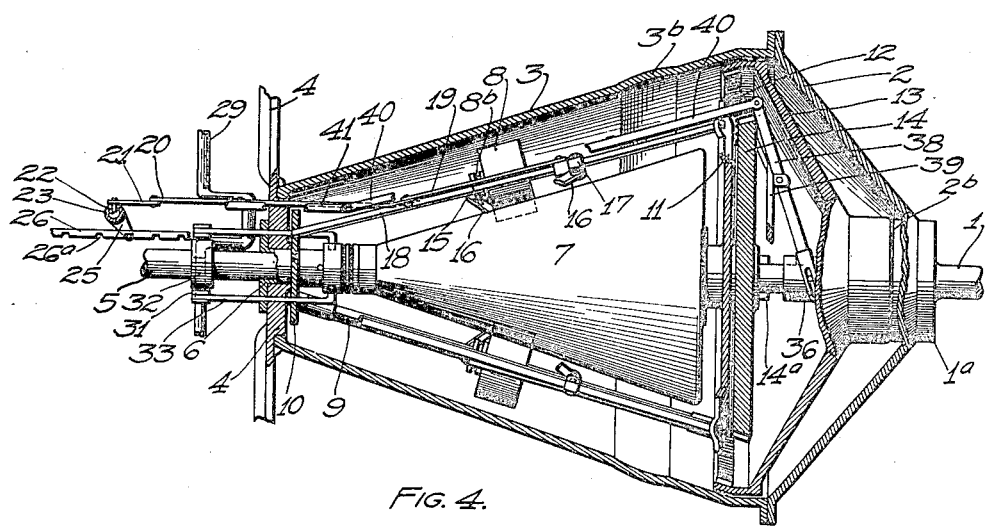

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a longitudinal sectional view of my transmission mechanism complete, with parts shown in elevation and broken away and in section to facilitate the illustration; Fig. 2 is a partial sectional and end elevational view taken at 2—2 of Fig. 1 and showing the arrangement of the speed and direction changing lever and the clutch pedal; Fig. 3 is a sectional view taken through 3—3 of Fig. 1 showing portions broken away; Fig. 4 is a sectional view taken through 4—4 of Fig. 1 with portions broken away to facilitate the illustration; and Fig. 5 is a fragmentary sectional view taken through 5—5 of Fig. 1, showing more clearly the arrangement of the various shifting members.

Like characters of reference refer to similar parts and portions throughout the several views of the drawings.

The drive shaft 1, flange 2, driving casing 3, support 4, driven shaft 5, sleeve 6, cone 7, rollers 8, shafts 9, plate 10, journal support 11, gear pinions 12, internal forward driving gear 13, reverse gear 14, bifurcated shift members 15, arms 16, shifting members 17, guide rods 18, link 19, shifting rod 20, link 21, sleeve 22, shifting lever 23, bracket 24, shifting lever retaining member 25, quadrant 26, compression spring 27, foot pedal 28, shift rod 29, arm 30, clutch shift lever 31, collar 32, rods 33, collar 34, thrust bearing 35, clutch 36, key 37, lever 38, support 39, link 40, clutch shift rod 41, levers 42 and 43, support 44, pin 45, slide link 46, bell crank 47, and the rod 48 constitute the principal parts and portions of my transmission mechanism.

The flange 2 is secured to the flange portion 1ª of the crank shaft of the engine or drive shaft of the motor by the screws 1ᵇ. The driving casing 3 is cone-shaped and is secured at its larger end to the flange 2 by means of screws 2ª. The cone-shaped casing 3 is revolubly mounted at its smaller end in the support 4 which is supported on the frame or chassis of the vehicle. The casing 3 is preferably made of sufficient weight to serve as a fly wheel and is also provided at its larger end with a gear or gear rack 3ª extending around the same adapted to be engaged by the pinion of the starter mechanism. A sleeve 6 is positioned centrally in the support 4 and is secured thereto and extends inwardly some distance in the casing 3. The driven shaft 5 is revolubly mounted in the sleeve 6 at one portion and in the flange 2 at its one end. A cone 7 is revolubly mounted at its small end on the sleeve 6 and at its larger end on the hub of the journal support 11. A plurality of power transmitting rollers 8 are adapted to operate in the space between the inner surface of the driving casing 3 and the outer surface of the cone 7 and are shiftably mounted on the shafts 9 which are preferably square in cross-section. It will be here noted that there is considerable clearance between the rollers 8 and their supporting shafts to permit transverse movement on said shafts. Said shafts 9 are revolubly mounted near their converging ends in the plate 10 and support 4 and near their other ends in the journal support 11 which is mounted on the inwardly extending end of the sleeve 6. It will be here noted that the shafts 9 are slightly offset circularly in their respective journals in the members 10 and 11 in such a manner that the rollers 8 will tend to be shifted along the shafts 9 in the direction of their diverging ends when said rollers are in engagement with the inner surface of the casing 3, as shown best by the solid and dotted circles of the protruding ends of the shafts 9 in Fig. 2 of the drawings. Mounted near the diverging ends of said shafts are the pinions 12 which simultaneously mesh with the internal gears 13 and the external or reverse gear 14. The gear 13 is revolubly mounted on the collar $2^a$ which is secured to the flange 2 by the screws $1^b$. Said collar $2^b$ is provided with an annular groove $2^c$ which is adapted to receive ends of the screws $13^a$ provided in the hub of the gear 13 and thus position the gear 13 with respect to the collar $2^b$. The reverse gear 14 is revolubly mounted on the shaft 5 at the end of the inwardly extending sleeve 6 and is provided with oppositely disposed lugs $14^a$ adapted to engage the clutch 36 as will be described later. The rollers 8 are provided on one side with reduced portions $8^a$ provided with annular grooves $8^b$ which are adapted to receive the lugs at the ends of the arms of the bifurcated shift members 15. The said bifurcated members are provided with arms 16 pivotally secured thereto at their one ends and also pivotally mounted at their other ends in the shifting members 17. The shifting members 17 are so positioned with relation to the rollers 8 that each one is connected to and shifts two rollers 8 and also in such a position that each roller is connected to and shifted by two shifting members 17. Said shifting members 17 are shiftably mounted on the guide rods 18, also preferably square in cross-section which are supported at their ends in the plate 10 and support 11. One of said shifting members is connected to the shift rod 20 by the link 19 which is pivotally connected to both members. The shifting rod 20 is pivotally connected by means of the link 21 to an arm $23^b$ of the lever 23 extending through a wide slot $22^a$ in the sleeve 22. Said sleeve 22 is pivotally mounted on the bracket 24 which is supported by the support 4. A shift lever 23 is rotatably and shiftably mounted within the sleeve 22 and is provided at its upper end with a knob $23^a$ to facilitate the handling of said shift lever. A spring $22^b$ is interposed between the lower end of the sleeve 22 and a pin $23^c$ in the lever 23. Said shift lever is provided at its lower end with a shift lever positioning member which is adapted to ride on the quadrant 26 secured to the support 4 and is also adapted to be retained and positioned by the various notches $26^a$ provided in said quadrant. It will be here noted that by turning the knob $23^a$ of the shift lever 23 slightly to the right the shift lever retaining member 25 will be disengaged from the notches $26^a$ in the quadrant 26 allowing the shift lever to be shifted back and forth as desired. It will also be noted that as the rollers 8 are automatically shifted along the shafts 9 the arm portion $23^b$ connected to said rollers will also first turn the lever 23 clockwise, disengage the retaining member 25 from the quadrant 26 and permit the lever 23 to be automatically shifted with the rollers 8.

A compression spring 27 is interposed between a shoulder at the small end of the cone 7 and the hub of the support 11 to keep the various rollers 8 in constant frictional engagement with the inner surface of the casing 3. To facilitate the longitudinal shifting of the rollers 8 on the shafts 9 I have provided foot pedal and lever means to longitudinally shift the cone 7 on the bushing 6, relieve the pressure against the rollers 8 and permit the same to slide freely on the shafts 9 without revolving. The foot pedal 28 is positioned in the conventional manner above the floor boards of the vehicle and is connected at the end projecting below the floor boards to the shift rod 29 by the arm 30 which is pivotally connected to said foot pedal and fixed to said shift rod. Said shift rod 29 is rotatably mounted in the journals $4^a$ secured to the support 4 and is provided near its middle with an offset portion to permit the shift lever 23 to be shifted in its path without obstruction. A bifurcated clutch lever 31 is mounted on said shift rod 29 in line with the shaft 5 adapted to shift a collar 32 longitudinally on said shaft, which collar serves merely as a guide for the rods 33 which extend through the support 4 and are mounted at their other ends in the collar 34 which is shiftably mounted on the sleeve 6 within the casing 3. A thrust bearing 35 is interposed between said collar 34 and the hub at the small end of the cone 7 to facilitate the shifting of said cone.

To automatically shift the friction rollers to their initial or low position I have provided lever and link means in connection with the shift lever and foot pedal as shown best in Fig. 1 of the drawings. The slide link 46 is shiftably mounted on a transverse arm portion 23$^d$ on the shift lever 23 extending through a wide slot 22$^c$ on the near side of the sleeve 22. Said slide link 46 is pivotally connected at its other end to the bell crank 47 which is pivotally mounted on the bracket 24. Said bell crank is pivotally connected at its other end to the rod 48 which is also pivotally secured at its other end in the arm 30 connected to the foot pedal 28. It will be here noted that if it is desired to stop the vehicle or other driven mechanism the foot pedal is forced downwardly, relieves the cones 7, disengages the shift lever retaining member 25 from the notches 26$^a$ in the quadrant 26 through the members 46, 47 and 48 and returns the lever 23 and the rollers 8 to their initial or low position.

A clutch member 36 is shiftably mounted near the one end of the driven shaft 5 and rotates with the same by reason of the key 37 mounted in said shaft and seated in said clutch member 36. This clutch member 36 is shifted into engagement with the flange member 2 for direct drive, and into engagement with the internal gear member 13 for forward variable speed drive, and into engagement with the external gear member 14 for reverse drive, and out of engagement with all of said members and positioned between the gears 13 and 14 for neutral. A lever 38 is pivotally mounted intermediate its ends on the support 39 which is mounted on the extended diverging ends of the shaft 9. Said lever 38 is provided with a bifurcated portion 38$^a$ at its one end straddling the clutch member 36 and adapted to shift the same on the shaft 5. Said lever 38 is connected at its other end to the clutch shift rod 41 by the link 40 positioned in the space between the casing 3 and the cone 7 and the two driven gears. Said clutch shift rod 41 is provided with transversely mounted pins 41$^a$ and 41$^b$ engaging respectively the bifurcated levers 42 and 43, the former being provided to directly connect the driven and the driving shaft by pulling the lever 23 backwardly while the latter bifurcated lever 43 is provided to connect the reverse gear 14 with the driven shaft 5 by raising the knob 23$^a$ or lever 23 longitudinally in the sleeve 22. The lever 42 is pivotally mounted on an arm 24$^a$ extending outwardly on an arm 24$^a$ extending outwardly from the bracket 24. The lever 43 is pivotally mounted on a support 44 secured in any convenient manner to the frame of the vehicle or the engine mounting and is also adapted to guide the clutch shift rod 41 at its free end. The pin 45 is secured in the lever 23, projects through the sleeve 22 and is adapted to engage each of the bifurcated levers 42 and 43 when the shift lever 23 is shifted in various positions. The lever 42 is so constructed at its engaging portion with the pin 45 so that said lever is shifted in one direction by engagement with said pin and automatically released or shifted in the opposite direction by the opposite movement of the shift lever 23. Similarly by raising the knob or the shift lever when in the forward position the reverse gear will be thrown into engagement and by releasing the lever 23 the reverse gear will be thrown out of engagement. The driving casing 3 is provided near its large end with an offset annular channel 3$^b$ so positioned in said casing that prior to the engagement of the pin 45 with the lever 42 or the direct connection of the driving and the driven shaft the various rollers 8 will be automatically disengaged from the inner surface of the casing 3 and thus disengage the auxiliary variable driving mechanism.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

Having thus described my invention what I claim as new and desire to secure by Letters Patent is:

1. A transmission mechanism including, a driving shaft, a driven shaft, a cone shaped driving casing secured to said driving shaft, a friction cone revolubly and shiftably mounted on said driven shaft, a plurality of revolubly mounted roller shafts positioned between said driving casing and said friction cone, friction rollers longitudinally shiftable and non-revolubly mounted on said roller shaft adapted to frictionally engage the said driving casing and said cone, pinions secured to the extended portion of said roller shafts, a gear revolubly mounted on said driving shaft, clutch means connecting said gear with said driven shaft, automatic means in connection with said roller shaft for automatically shifting said rollers with relation to said driving casing and said cone, and manual means for manually shifting said rollers on said roller shafts.

2. A transmission mechanism, including a driving shaft, a driven shaft, a cone shaped driving casing secured to said driving shaft, a friction cone revolubly and shiftably mounted on said driven shaft, a plurality of revolubly mounted roller shafts positioned between said driving casing and said friction cone, friction rollers longitudinally shiftable and non-revolubly mounted on said roller shafts adapted to frictionally engage the said driving casing and said cone, pinions secured to the extended portion of said roller shafts, a gear revolubly mounted on said driving shaft, a gear revolubly mounted on said driven shaft, both of which are adapted to be engaged by said pinion on said roller shaft, a clutch member shiftably mounted on said driven shaft, clutch means on both of said revolubly mounted gears adapted to be engaged by said shiftable clutch member, means for shifting said clutch member, automatic means in connection with said roller shafts for automatically shifting said rollers, manual means for manually shifting said rollers on said roller shafts.

3. A transmission mechanism, including a driving shaft, a driven shaft, a driving cone secured to said driving shaft, a support adapted to support the free end of said driving cone, a friction cone revolubly and shiftably mounted on said driven shaft, a plurality of roller shafts positioned between said driving cone and said friction cone, friction rollers longitudinally shiftable on said roller shafts adapted to frictionally engage said driving cone and said friction cone, automatic means connected with said roller shaft for automatically shifting said rollers with relation to said driving cone and said friction cone, manual means for manually shifting rollers on said roller shaft, a gear revolubly mounted on said drive shaft, a gear revolubly mounted on said driven shaft, pinions mounted on said roller shafts adapted to engage both of said gears, a clutch member shiftably mounted on said driven shaft, clutch means on said driving shaft and on said revolubly mounted gears adapted to engage the shiftable clutch member on said driven shaft, a means for longitudinally shifting said clutch member, an offset means in connection with said driving cone whereby the rollers are released from frictional engagement therewith, and a foot pedal means for longitudinally shifting said cone on said driven shaft.

4. A transmission mechanism, including a driving shaft, a driven shaft, a cone shaped driving casing secured to said driving shaft, a plurality of revolubly mounted roller shafts positioned contiguous to said driving casing and parallel therewith, friction rollers longitudinally shiftable and non-revolubly mounted on said roller shaft adapted to frictionally engage said driving casing, pressure means whereby said friction rollers are forced in frictional engagement with said driving casing, power transmitting means connecting said roller shaft with said driven shaft, automatic means in connection with said roller shaft for automatically shifting said rollers on said roller shaft with relation to said driving casing, and manual means for manually shifting said rollers on said roller shaft.

5. A transmission mechanism, including a driving shaft, a driven shaft, a cone shaped driving casing secured to said driving shaft, a plurality of revolubly mounted roller shafts positioned contiguous to said driving casing and parallel therewith, friction rollers longitudinally shiftable and non-revolubly mounted on said roller shafts adapted to frictionally engage said driving casing, pressure means whereby said friction rollers are forced in frictional engagement with said driving casing, power transmitting means connecting said roller shafts with said driven shaft, automatic means in connection with said roller shafts for automatically shifting said rollers on said roller shafts with relation to said driving casing, manual means for manually shifting said rollers on said roller shafts and lever means in connection with said pressure means whereby said pressure means is released from said friction rollers.

6. A transmission mechanism, including a conical driving casing, a longitudinally shiftable cone positioned therein, rollers interposed between the inner surface of said casing and the outer surface of said cone and shafts so positioned, on which said rollers are mounted that said rollers tend to move toward the larger end of said casing with their revolution.

7. A transmission mechanism, including a conical driving casing, a longitudinally shiftable cone positioned therein, rollers interposed between the inner surface of said casing and the outer surface of said cone and shafts so positioned, on which said rollers are mounted that said rollers tend to move toward the larger end of said casing with their revolution, and means for manually shifting said rollers longitudinally on said shafts.

8. A transmission mechanism, including a conical driving casing, a longitudinally shiftable cone positioned therein, rollers interposed between the inner surface of said casing and the outer surface of said cone, shafts so positioned, on which said rollers are mounted that said rollers tend to move toward the larger end of said casing with their revolution, and means connected with a clutch pedal of a vehicle for shifting said rollers toward the small end of said casing with the operation of said clutch pedal.

In testimony whereof, I have hereunto set my hand at San Diego, California, this 24th day of May, 1922.

ERVIN E. ROBERTS.